US010547617B2

(12) United States Patent
Givoni et al.

(10) Patent No.: US 10,547,617 B2
(45) Date of Patent: *Jan. 28, 2020

(54) CROSS ACCESS LOGIN CONTROLLER

(71) Applicant: Ruckus Wireless, Inc., Sunnyvale, CA (US)

(72) Inventors: Doron Givoni, Netanya (IL); Oleg Pogorelik, Lapid (IL)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/721,537

(22) Filed: Sep. 29, 2017

(65) Prior Publication Data

US 2018/0278615 A1 Sep. 27, 2018

Related U.S. Application Data

(63) Continuation of application No. 15/371,797, filed on Dec. 7, 2016, now Pat. No. 9,807,098, which is a continuation of application No. 14/733,333, filed on Jun. 8, 2015, now Pat. No. 9,548,983, which is a continuation of application No. 13/897,052, filed on (Continued)

(51) Int. Cl.
H04L 9/32 (2006.01)
H04L 29/06 (2006.01)
H04W 12/06 (2009.01)
H04W 12/08 (2009.01)

(52) U.S. Cl.
CPC .............. H04L 63/10 (2013.01); H04L 63/08 (2013.01); H04L 63/0815 (2013.01); H04L 63/0876 (2013.01); H04L 63/0892 (2013.01); H04L 63/107 (2013.01); H04L 63/18 (2013.01); H04W 12/06 (2013.01); H04W 12/08 (2013.01); H05K 999/99 (2013.01); G06F 2221/2111 (2013.01)

(58) Field of Classification Search
CPC ... H04L 63/08; H04L 63/083; H04L 63/0815; H04L 63/0823; G06F 21/31
USPC ..................................................... 726/2, 3, 5
See application file for complete search history.

(56) References Cited

U.S. PATENT DOCUMENTS 9,055,073 B2 * 6/2015 Givoni .................... H04L 63/10
9,548,983 B2 * 1/2017 Givoni .................... H04L 63/10
(Continued)

Primary Examiner — Baotran N To
(74) Attorney, Agent, or Firm — Stewart M. Wiener

(57) ABSTRACT

Systems and methods here may be used for authorizing network access including using a controller with a processor and memory, the controller in communication with a first network for controlling access to the first network. From a user equipment having a user registered in a visitor network, an access request to access the first network is received, wherein the access request includes a MAC address of the user equipment. Based on a query performed in a subscriber repository, if the received MAC address is not found, a credential request is sent to the user equipment, and a credential is received from the user equipment. A single use code is generated, stored in the subscriber repository, and sent to the user equipment via a trusted channel. A new code and a new credential are received via the visitor network, and are compared. If the new code and the single use code match, the new credential is registered for re-use by the user equipment.

17 Claims, 8 Drawing Sheets

Related U.S. Application Data

May 17, 2013, now Pat. No. 9,055,073, which is a continuation of application No. PCT/IL2011/050019, filed on Nov. 17, 2011.

(60) Provisional application No. 61/414,533, filed on Nov. 17, 2010.

(56) References Cited

U.S. PATENT DOCUMENTS

| | | | |
|---|---|---|---|
| 9,807,098 B2* | 10/2017 | Givoni | H04L 63/10 |
| 2003/0208628 A1* | 11/2003 | Karjanlahti | H04W 8/12 |
| | | | 709/249 |
| 2009/0019521 A1* | 1/2009 | Vasudevan | G06F 21/6218 |
| | | | 726/3 |
| 2009/0313680 A1* | 12/2009 | Hirano | H04L 63/104 |
| | | | 726/3 |
| 2013/0263234 A1* | 10/2013 | Givoni | H04L 63/10 |
| | | | 726/5 |
| 2015/0271182 A1* | 9/2015 | Givoni | H04L 63/10 |
| | | | 726/4 |
| 2017/0085571 A1* | 3/2017 | Givoni | H04L 63/10 |
| 2018/0278615 A1* | 9/2018 | Givoni | H04L 63/10 |

* cited by examiner

CROSS ACCESS LOGIN CONTROLLER

CROSS-REFERENCE TO RELATED APPLICATIONS

This patent application is a continuation of and claims priority to U.S. application Ser. No. 15/371,797 (now issued as U.S. Pat. No. 9,807,098) filed on Dec. 7, 2016, which is a continuation of U.S. application Ser. No. 14/733,333 (now issued as U.S. Pat. No. 9,548,983) filed on Jun. 8, 2015, which is a continuation of U.S. application Ser. No. 13/897,052 (now issued as U.S. Pat. No. 9,055,073) filed on May 17, 2013, which is a continuation of international application No. PCT/IL2011/050019 filed on Nov. 17, 2011, which claims priority to U.S. provisional application No. 61/414,533 filed on Nov. 17, 2010, all of which are hereby incorporated by reference in their entireties.

FIELD OF THE INVENTION

This invention relates to cross access login controller, and in particular to a controller for managing access to the converged network.

BACKGROUND OF THE INVENTION

Typical network control architecture of today includes several major components working in cooperation in order to enable service provisioning.

FIG. 1 illustrates basic network architecture.

As illustrated in FIG. 1, user equipment is connected to the Access Network (8), attached to the Access Gateway (2), managing users access to the Backbone (also called Core) Network (7). Connecting procedure is managed by the access gateway (2) and includes configuration of the user's equipment (1) assisted by DHCP (dynamic host configuration protocol) Server (3) user authentication and authorization assisted by AAA (Authorization, Authentication and Accounting) Server (4).

Both DHCP and AAA server in their operation may query user details, stored in subscriber profiles repository (6).

User equipment (i.e. clients) parameters are usually utilized for creating credentials enabling un-ambiguous user identification. User equipment may be a mobile phone device, a PDA, a personal or portable computer, or any other electronic device capable and configured for carrying out communication with other devices. User equipment parameters can be e.g. Phone Number, MAC address, physical Port, Virtually Private Network ID, etc.

User must be registered in the Subscriber Profiles Repository before getting network access. Registration is made with respect to a single type of connection and thus enables the access to a single type of connection. User information can be entered by customer relationship management (CRM) systems and stored in the dedicated data bases (so called SPR—Subscriber Profiles Repository). When Access Gateway (2) receives an access request, sent from a client, during user login, the user's credentials (also referred to as subscriber's credentials) are retrieved from the access request and compared with those stored in the SPR. If the credentials are identical, access is permitted to the network, via the type of connection corresponding to the credentials. In some networks (typical for the networks with promiscuous access, like Wi-Fi) User Portal (5) can be used for interactive entering access credentials. In other cases (fixed connection, like DSL or Cellular) user credentials can be retrieved from the connection details (port, user equipment permanent unique settings, such as MAC address) incorporated into the request by the access side equipment (e.g. DSL modem, Digital Serial Line Multiplexer, etc.).

Network access gateway (2) (also called access controller) (such as GGSN (Gateway GPRS (General Packet Radio Service) Support Node) via AAA (Authorization, Authentication, Accounting) Server, etc. are intensively accessing the SPR in order to manage user access, sessions and services.

AAA, SPR, DHCP & other applications, create closed and protected environment (may also be referred to as Provider's Back Office). Back Office is usually coupled with appropriate network type (Cellular, DSL, Wi-Fi, etc.). Thus, in case when a service provider manages several networks of the different access types, each one will be served by dedicated backoffice environment. Accordingly, in order to access several core network of different access types a user must be registered to number of backoffice SPR each corresponding to the different access types.

Modern user equipment such as cellular phone, laptop, etc. has several network adapters and able to support different types of connections, such as GPRS, Wi-Fi, Wi-Max, etc. In many cases, such as, restricted connectivity in appropriate location, network node congestion, high cost of the traffic, and the like, a user may wish to, take advantage of the ability to utilize different types of connections and connect to a network over feasible alternative (also called Visited network) network available in the area, or to switch between the network connections in the area, where available. Switching between network connections can be, for example, between any one of Cellular to Wi-Fi, Cellular to Wi-Max, Wi-Fi to Cellular, Wi-Fi to Wi-Max, etc.

Switching could also be performed between the networks of the same type, running by different providers as well, i.e. Wi-Fi_1 to Wi-Fi_2, or Cellular_1 to Cellular_2. All of the mentioned switches depend on device properties, and its support in the different kind of network connection.

In the following discussion the term "Home Network" is used to refer to a network in which the user is registered. The term "Visited Network" is used to refer to a network in which the user is not registered.

As explained, a user must be registered in the SPR(6) of the appropriate Home Network with respect to one or more types of network connection, before attaining network access.

In cases where a user attempts to access a network via visited network, to which he is not registered, visited network control engines query home network controllers for temporary credentials. The temporary credentials are used for user authentication in respect of a single session only, and once connection is terminated, the temporary credentials are destroyed in the visited network. Any future attempt, to access the visited network, made by the same unregistered user, will require the user to go through the same procedure of using the temporary credentials.

As shown in FIG. 2, A user tries to connect visited network (to which he is not registered in), using user equipment. In this example the visited network is WiFi network.

Access controller 2.2 looks in the local SPR 2.6.2 and if the user's credentials such as phone number, MAC address, ID, etc. which are provided within the query, are not found in the local SPR 2.6.2, home network controller 2.1 will be queried for the appropriate credentials.

Credentials, accepted from the home network are used in user Authentication and Authorization. For example user may be prompted with WEB page and asked to enter user ID and Password (same as in home network or dedicated one time ID and Password allocated for login in the visited network).

After Authentication procedure is completed, users credentials are destroyed in visited network, so that next time network controllers and user will need to go through the same procedure again, i.e. ask home network for the credentials.

SUMMARY OF THE INVENTION

In view of the above, in order to connect over visited network, user have, to go through reoccurring, irritating and error prone login procedure, including entering credentials by the user during login to the visited network (for example—enter user ID, password and secret code). To support this procedure credentials must be created/retrieved and transferred between home and visited network, which requires secure and trusted communication channel between the two. This procedure is executed at each connection to the visited network, even if the user had already connected to that visited network in the past.

Enabling users to perform seamlessly transparent login to the one or more of the alternative networks, i.e., direct login to the visited network, without requiring the user or the visited network, to carry out the above procedure, enables the operator to improve user experience and minimize investments in the transport and network control infrastructures, and on the other hand, allow the user to directly connect to each of the available network, without the need to be actively authenticated each time.

Automated transparent login creates an infrastructure for easier convergence between different networks based on various access technologies such as Wi-Fi, Wi-Max, Cellular, DSL, etc. It may serve as enabling technology for the most advanced network scenarios such as Traffic offload, Network Congestion Management, etc. Traffic offload refers to a scenario where a user can switch to the alternative network available in the area due to some criteria, such as inexpensive tariff, better quality of service, reliability, etc. For example to obtain Video Services user will have to go through the Wi-Fi network, since Cellular video transfer is too expensive and won't support Video of high quality.

Congestion Management is a kind of traffic offloading that is applied in case of overloading of the network in specific location or device. For example, when cellular network is overloaded, user may be automatically switched to the Wi-Fi network available in the area.

Congestion Management is also aimed to provide a mean for service provider to encourage users to use a less expansive network infrastructure, so that load is reduced on the more costly network and as such, network expansion could be delayed or diminished.

In order to cope with traffic and business challenges (network congestion, expensive traffic) operator (i.e. service provider) may provide the user with several access technologies supported in the same geographic location and make them concurrently available for the user. The service provider may support the various technologies himself in each geographical area, or may re-use networks of other service providers.

No matter which network the user is connected to, the operator should ensure consistent user experience in handling typical user operational flows, such as login authentication and authorization, service control, etc. For example, when connecting to a portal over cellular network using, for example, a cell phone, does not require any authentication and authorization from the user, since connection is based on a unique MSISDN number of the cell phone. In order to provide the same experience to the user while connecting internet over Wi-Fi using the same cellular phone, an operator has to overcome the problem of identification of the user as MSISDN is only available for the mobile interface on the device, where for the WiFi connection only MAC address is available which is not considered as secure enough creational and does not provide any correlation to the mobile account.

In order to provide the same experience to the user while connecting to the internet over Wi-Fi, the operator has to overcome the problem of identification of the user that has no MSISDN but MAC address instead.

Therefore, a system solution and methodology for automated registration and seamless login of the user into visited networks is required.

The invention could be applied to different networks with the same access type or different network with different access types (such as Wi-Fi, Cellular, DSL, Wi-Max, etc.) that belongs to the same or different service providers.

According to one aspect of the invention there is provided a method of controlling access to a network, the method comprising: storing in a data repository first identifying detail relating to a second type of connection and associating said details with respective base credential relating to a first type of connection; and granting a request to access to network via second type of connection, said request comprises a second identifying detail, if a correlation is found between said second identifying detail and said first identifying detail.

In accordance with certain embodiments, the present invention also provides, a system for controlling access to a network, the system comprising: a data repository associated with a controller; said data repository configured to store first identifying detail relating to a second type of connection and associate said details with respective base credential relating to a first type of connection; and responsive to a request comprising a second identifying detail, said controller is configured to grant access to a network via a second type of connection, if a correlation is found between said second identifying detail and said first identifying detail.

In accordance with certain embodiments, the present invention also provides a program storage device readable by machine, tangibly embodying a program of instructions executable by the machine to perform a method of controlling access to a network, the method comprising: storing in a data repository first identifying detail relating to a second type of connection and associating said details with respective base credential relating to a first type of connection; and granting a request to access to network via second type of connection, said request comprises a second identifying detail, if a correlation is found between said second identifying detail and said first identifying detail.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
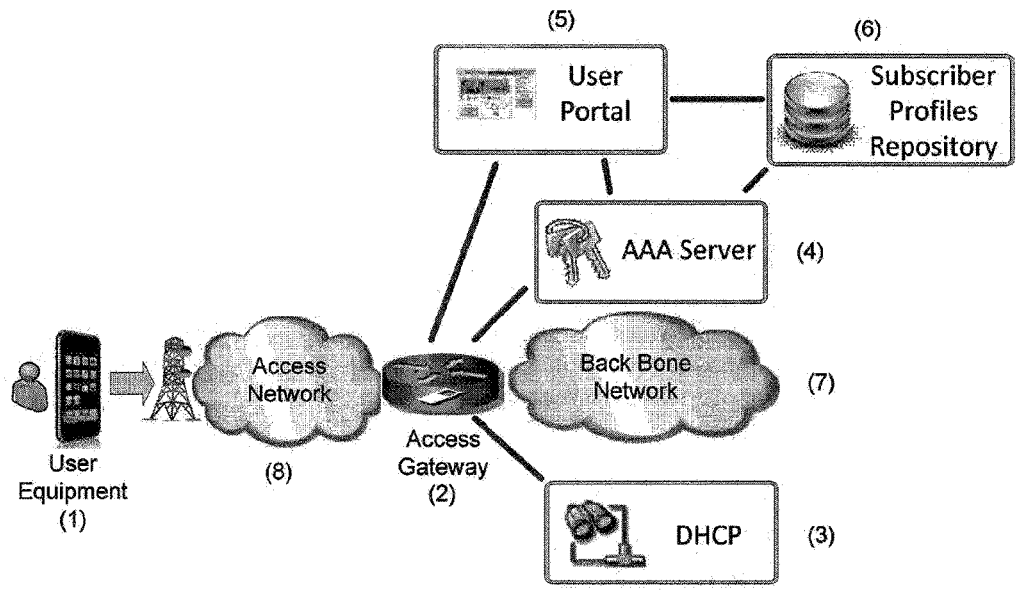
FIG. 1 illustrates a typical network control architecture, as known in the prior art.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "controlling", "configuring", "receiving", "enabling", "performing", "executing", "determining", or the like, include action and/or processes of a computer that manipulate and/or transform data into other data, the data represented as physical quantities, e.g. such as electronic quantities, and/or the data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the present invention. Reference in the specification to "one implementation", "some implementations", "certain implementations", "other implementations", "another implementations", "one embodiment", "an embodiment", "some embodiments", "another embodiment", "other embodiments", "certain embodiments", "one instance", "some instances", "one case", "some cases", "other cases" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "certain embodiments", "other embodiments", "one instance", "some instances", "one case", "some cases", "other cases" or variants thereof does not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

In embodiments of the invention, fewer, more and/or different stages than those shown in the figures may be executed. In embodiments of the invention one or more stages illustrated the figures may be executed in a different order and/or one or more groups of stages may be executed simultaneously.

Certain embodiments of the present invention are applicable to the architecture of a computer system described with reference to FIG. 3. However, the invention is not bound by the specific architecture, equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability); operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Turning to the detailed description of the invention, every access type (Cellular, Wi-Fi, DSL, etc.) provides different unique technical parameters (also known as user credentials), used for user authentication. For example, MSISDN could be used for identifying user of the cellular network, while MAC address could serve user ID in Wi-Fi network.

The basic idea is to correlate all possible user credentials (identifying details of user in accessing networks), and organize them in (one or more) credentials repository in a way enabling automated identification, authentication and authorization of the user, connecting over different access networks.

Running merged subscriber repository allows correlating the various credentials, which are valid for the different networks with user identity, so that user will be identified independently of the access network type. Namely, once a network access request of a second type is granted, according to certain embodiments of the invention, the controller may correlate the user accessing the network with the data correlated to the base credentials. Such data may be, for example, providing the user accessing the network the user's profile.

Credential repository is initially used for storing primary credentials. In the following discussing the term "Primary credentials" is used to refer to credentials associated with a user on his registration in a Service Provider. Usually they are generated by Customer Relationship Management (CRM) software or created by User himself and stored in the home subscriber profile repository.

Primary Credentials are complemented by alternative (visited) credentials as soon as user performs login over any alternative network. After a user is validated in alternative network, his credentials, useful for accessing the visited network are captured and stored in the subscriber repository, for further re-use in visited authentication and authorization.

After credentials related to the specific network are added to the credentials repository user will be able to switch seamlessly to the appropriate network.

Additional validation mechanisms based on the initial network connectivity and location correlation techniques could be added to ensure trusted secure registration of the alternative credentials.

Figure 3:
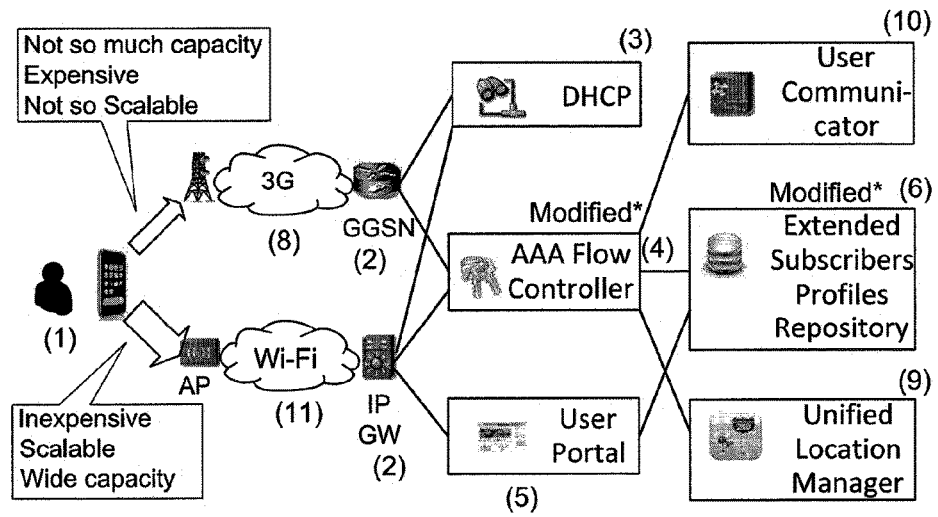
FIG. 3 illustrates suggested modern converged network architecture, with focus on invented Modified AAA Controller (4) and Extended Subscriber Repository (6)

According to certain embodiments of the invention, there is provided a complement for existing network infrastructure including typical network elements and operator back office subsystems (e.g. AAA Flow Controller, Subscriber Repository), as illustrated by FIG. 3.

Figure 2:
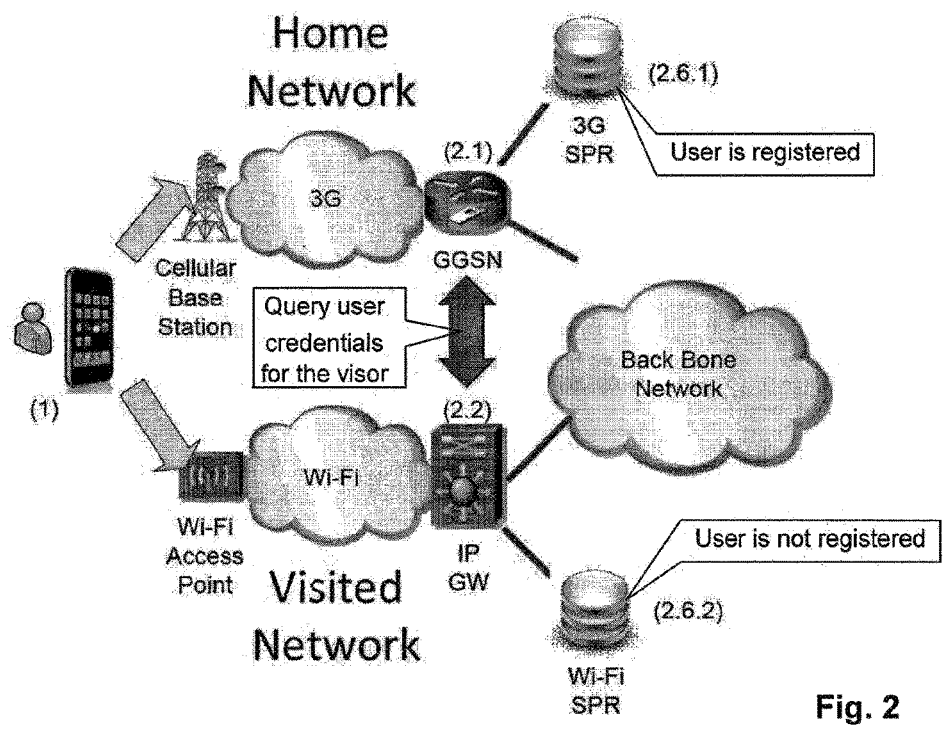
FIG. 2 illustrates communications between Home and Visited networks in order to support login in the visited network, as known in the prior art.

FIG. 3 complements FIG. 2 while emphasizing the modifications to be implemented in the prior art back-office systems. It specifies main Back-office modules, involved in the handling of the seamless transparent login. Modules functionality and collaboration is specified below.

As shown in FIG. 3, modules AAA Flow controller and Subscriber Profiles Repository must be modified in order to support transparent login. These modifications do not affect other back-office environment, which minimizes modification effort. AAA Flow controller—Advanced Authentication Authorization Flow Controller, running access control algorithms (explained below). It is responsible for retrieving user credentials from the network access request and further handling of the Authentication control flow. AAA Flow controller communicates with Extended Subscriber Profiles Repository in order to find and validate user's credentials, matching appropriate network while handle access requests, coming from the different access networks.

AAA Flow controller embeds configurable engines that adjust operational flow in correspondence with the specifics of the appropriate network type. For example in Wi-Fi network retrieving User ID (user is identified by MAC address) will lead to querying DHCP Server, while in case Cellular Network ID (MSISDN) is provided in the request, there is no need to query another system.

Extended Subscriber Repository—Repository maintaining users profiles, including user details and credentials. Extended repository should implement the model, where multiple credentials, appropriate to the specific network are associated with single user identity. So that various credentials of the same user matching different networks could be provided upon request. Subscriber repository is a centralized service, that may run above single as well as a distributed DB. In case of distributed DB centralized interface is implemented by the middleware.

DHCP—Dynamic Host Configuration server responsible for allocation access network specific parameters such as IP and keeping track on User Equipment specific parameters, such as MAC address, etc. involved in access request and following authentication procedure. DHCP server has dedicated DB used for tracking association of the IP address with user equipment parameters, such as MAC address, device type, etc.

While running independently, DHCP server may provide detailed information about user associated specific parameters to the external systems (such as AAA flow Controller) upon request.

User Portal—Manage web pages, supporting user login and interfacing back office subsystems, such as Access Server, SPR, etc. This portal is used for capture of the credentials, entered by user during login, (in known systems, user portal is activated in every connection of the user to visited network, whereas according to certain embodiments of the invention, user portal is activated only on the first registration in the visited network, after which his credentials are stored in the Extended Subscriber Repository) the User Portal could be used from time to time in order to re-verify/update subscriber details.

User Communicator (FIG. 3-10). Server used for communicating with the user by means of SMS-es (SMS controller), e-mails (Mail Server), MMS-es, Voice, etc.

Unified Location Manager—network information repository, containing information about network access elements and their locations (for example geographical location of the RAN Antenna, Cell, Wi-Fi hot spot, etc.). Access Element ID is a part of the access request, so it could be used for querying location manager and establishing user's location. According to certain embodiments of the invention, Location Manager can be used in the locations proximity check during first time registration or during access of a user via second type of connection. Location manager checks user position as seen in one network vs. the position as seen in the other network, assuming that user must be reported as appearing in the same or very close positions in all networks. A small gap between the identified locations is tolerated due to technical limitations and reasonable deviations in existing techniques. In case when the locations are too far (distance threshold is configurable in AAA Controller), system will invalidate authentication procedure.

Location correlation procedure is explained below.

GGSN—Gateway GPRS Support Node. The GGSN is responsible for the interworking between the 3G network (FIG. 3.8) and external packet switched networks, like the IP Network, shown as Wi-Fi (FIG. 3.11).

In some cases GGSN is responsible for IP address assignment and acts as the default router for the connected user equipment (UE). It may also handle authentication and charging functions.

Note: Depending on the type of connection, which can be any one of WiFi, DSL, Wi-Max, 3G, etc. GGSN could be substituted by any device implementing similar (network access control) functionality.

IP GW—network elements that acts as an entrance to IP network and managing access of the users, connecting over Wi-Fi access segment. The same as GGSN but used in Wi-Fi enabled networks.

Note: Depending on the type of connection, which can be any one of WiFi, DSL, Wi-Max, 3G, etc. IP GW could be substituted by any device implementing similar (network access control) functionality.

Several subsystems, such as Authentication and Authorization flow controller, subscriber profiles repository, location repository may need modification in order to accommodate advanced flows as explained below.

AP—Wireless access point (Wi-Fi, Wi-Max, etc.). Device that allows wired communication devices to connect to a wireless network using Wi-Fi, Bluetooth or related standards. The Wireless AP usually connects to a router (IP GW), and can relay data between the wireless devices (such as computers or printers) and wired devices on the network.

An operator should modify subscriber repository to support multiple credentials of the same user.

User credential structure must include access type for distinguishing between login requests, coming from the different access networks and Network ID in order to enable seamless login over different networks of the same type.

Figure 4:
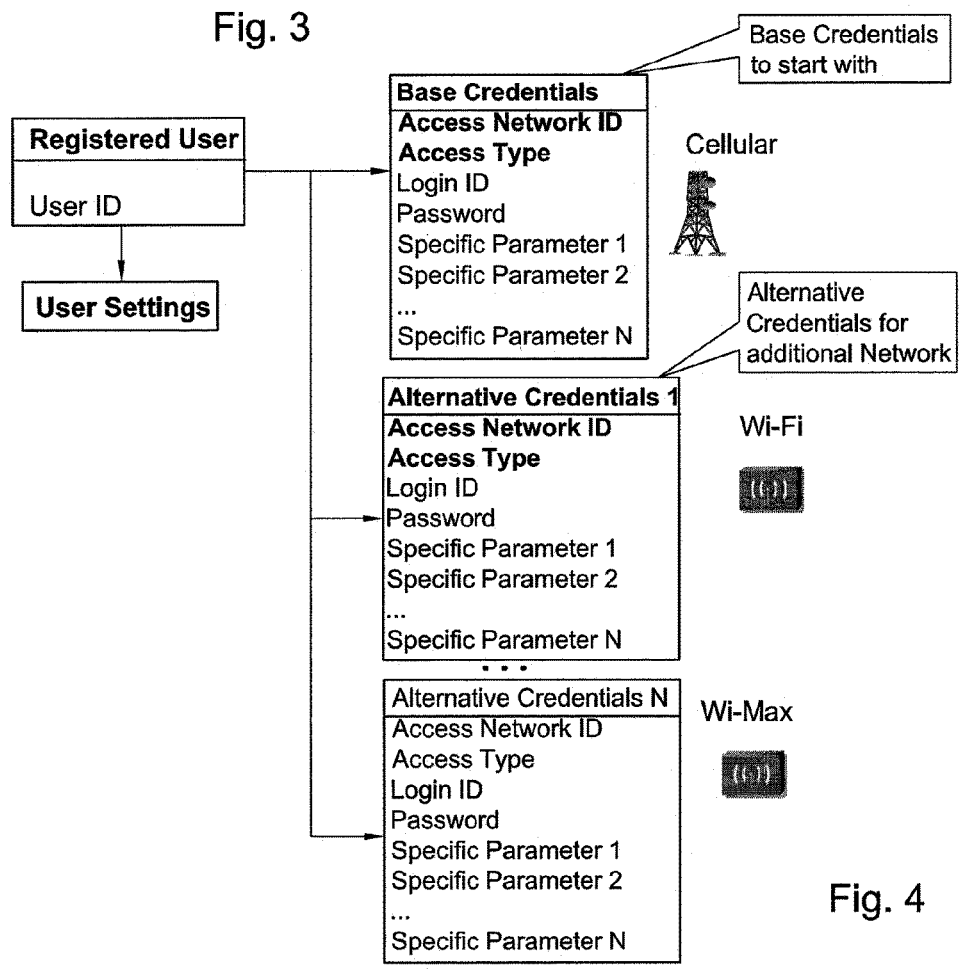
FIG. 4 illustrates schema of the Extended SPR, enabling chaining of the multiple credentials of the same user.

FIG. 4 provides schematic structure of the Subscriber Profiles Repository.

Upon user login, network access controller (FIG. 3.2) queries AAA flow controller for user authentication and authorization, while providing network specific parameters, such as MAC address, IP, Port Number, MSISDN, etc. used in user matching, Authentication and Authorization.

AAA flow controller will retrieve credentials from the access query for retrieving matching credentials of the appropriate access type from the SPR for the further validation.

In case when credentials are available and the match is succeeded, user will be connected to the network and provisioned with appropriate services as specified in the User Settings.

If there is no credentials matching this network type, user will be guided through the first time access registration procedure during which the user will be asked to enter a generated secret code, sent over available authenticated connection, in order to ensure secure registration.

Complementary validation strengthening techniques, such as location correlation could be applied per appropriate network types (as explained below).

FIG. 4 specifies the schema of the extended Subscriber Profiles repository, where user is associated with one or more credentials. As could be seen, user must have a primary credentials, called Base, that are provided during initial REGISTRATION IN The Home network. Additional credentials are added during user registration in additional networks. So that during recurrent logins in the network AAA flow controller will be able to identify the user by using any of the registered Base and Alternative credentials.

Figure 5:
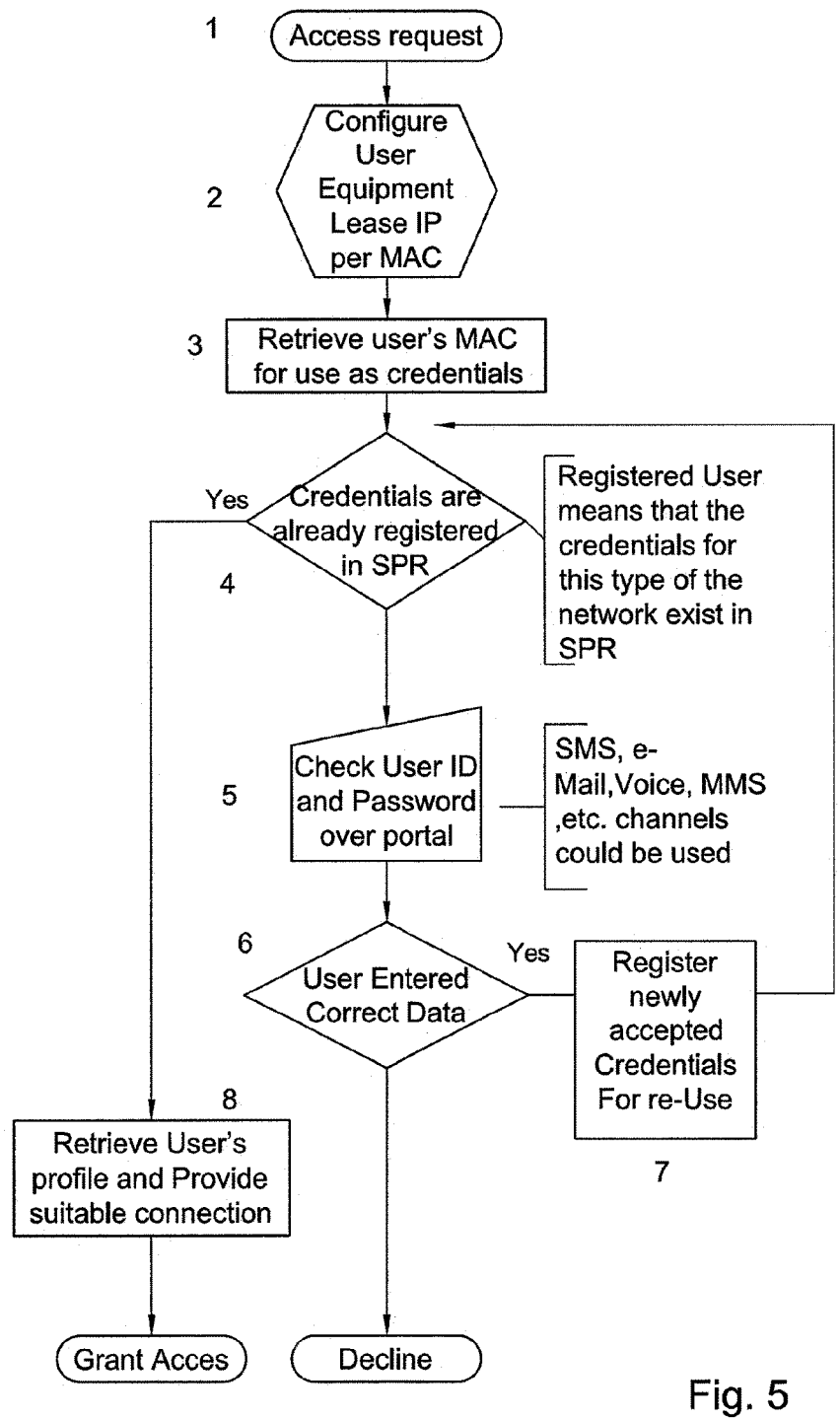
FIG. 5 illustrates basic algorithm of the access request handling for the registered user.

FIG. 5 is a flowchart illustrating the operation of accessing a network, according to an embodiment of the invention, using Wi-Fi as example.

Figure Explanation:

1—User switches on the Wi-Fi adapter in his device (e.g. smart phone). This causes DHCP request to be sent over the network.

2—DHCP server allocates IP address for the user device (also known as IP lease per user's MAC address) and sends it to the user equipment. User's MAC is stored in the DHCP DB together with IP and could be retrieved by the other systems upon demand.

3—After DHCP flow is completed, user traffic triggers a request from the IP-GW which is forwarded to the AAA Controller which query SPR in order to determine if appropriate user's credentials (e.g. MAC) are already registered.

4—If user credentials aren't registered yet, user will be forwarded to the Login portal.

5—Portal manages user registration—accepting authentication details.

6—Details are checked by the AAA controller.

7—Details are entered into the SPR for the further re-use.

8—In case when credentials are already registered in the DB user profiles is retrieved for the further provisioning in devices and user is connected to the network.

Assuming that a user has base credentials stored in the subscriber profile repository, which enables him to connect network over cellular network.

Note: Here and further Wi-Fi offloading of the Cellular traffic is used as an example.

Figure 6:
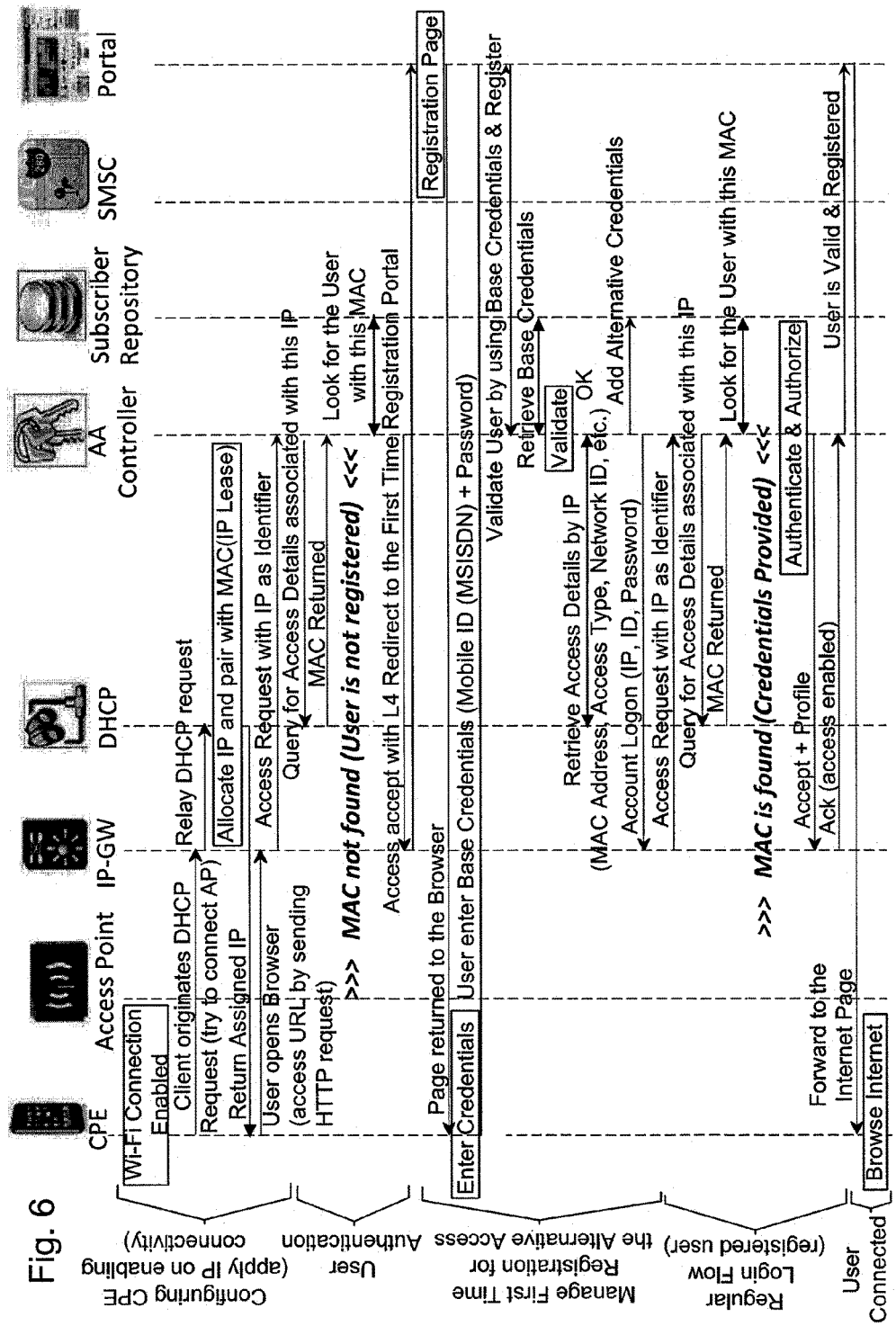
FIG. 6 illustrates flow of the user first time registration in the visited network.

In case when a user is trying to connect the network over Wi-Fi for the first time, AAA Controller detects an attempt and guides the user through the first time access registration procedure, as explained with further details in FIG. 6.

Corresponding message sequence chart relating to first time registration followed by login over alternative connection.

In order to ensure security the registration flow procedure can be accompanied by additional authentication processes from the user. Additional authentication processes can be for example, verifying a password provided to the user over SMS, verifying billing information such as payment means of the user, or other means which are deemed to uniquely identify the subscriber.

Flow below explains SMS assisted secure registration.

Figure 7:
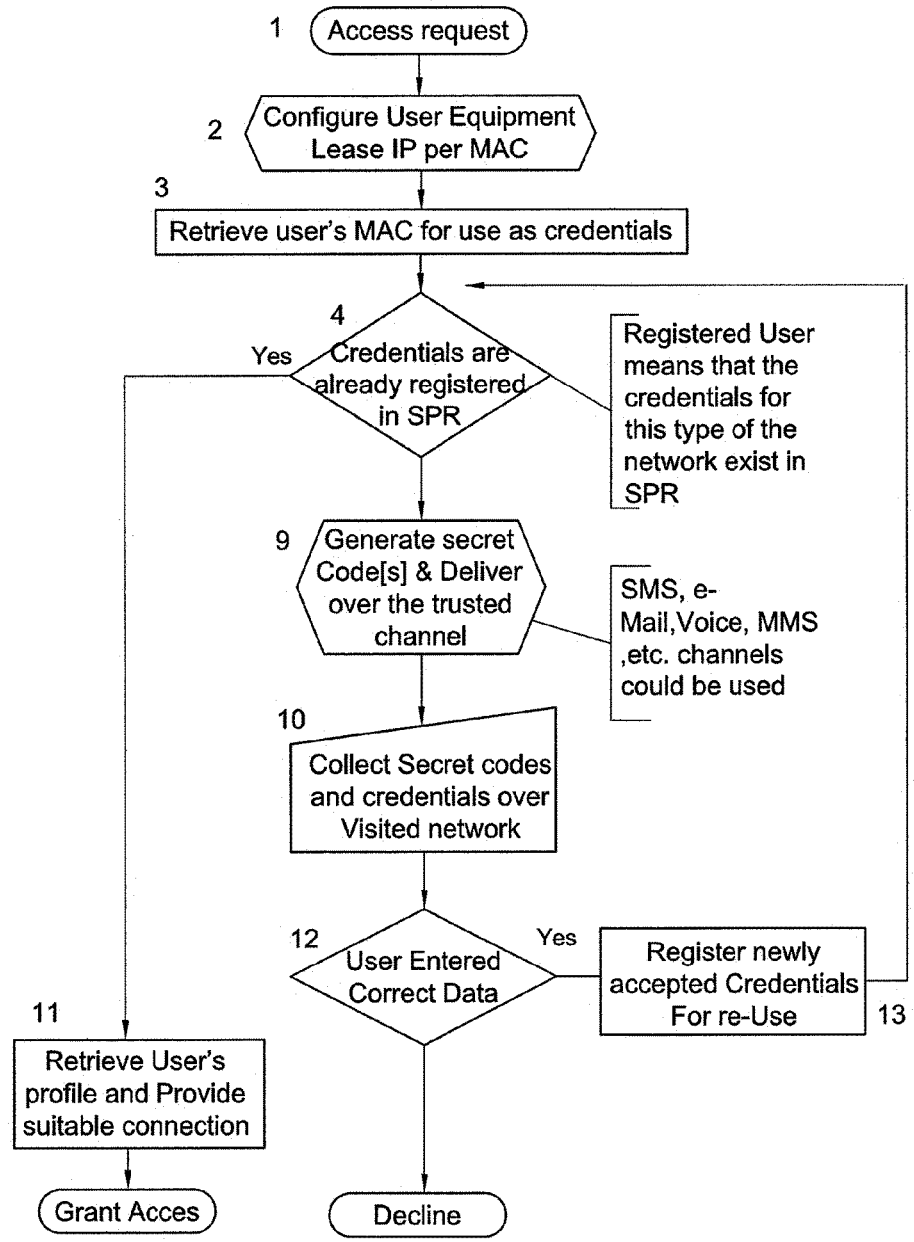
FIG. 7 illustrates algorithm of the first time registration in the visited network, hardened with secret code verification.

FIG. 7 is a flowchart illustrating an example of the operation of accessing a cellular network while assisting for example, SMS, to secure registration.

As shown in FIG. 7, SMS assisted registration utilizes the fact that user is connected over the cellular network. So user is asked to enter via portal additional secret code, delivered over SMS. Secret code is a unique combination of characters, generated by the server for a single transaction, so that it could not be re-used by other users repetitively. The secret key, provided by the SMS, can be delivered to the user via other various types of message communication, such as MMS, Voice, e-mail notifications, etc.

Figure 8:
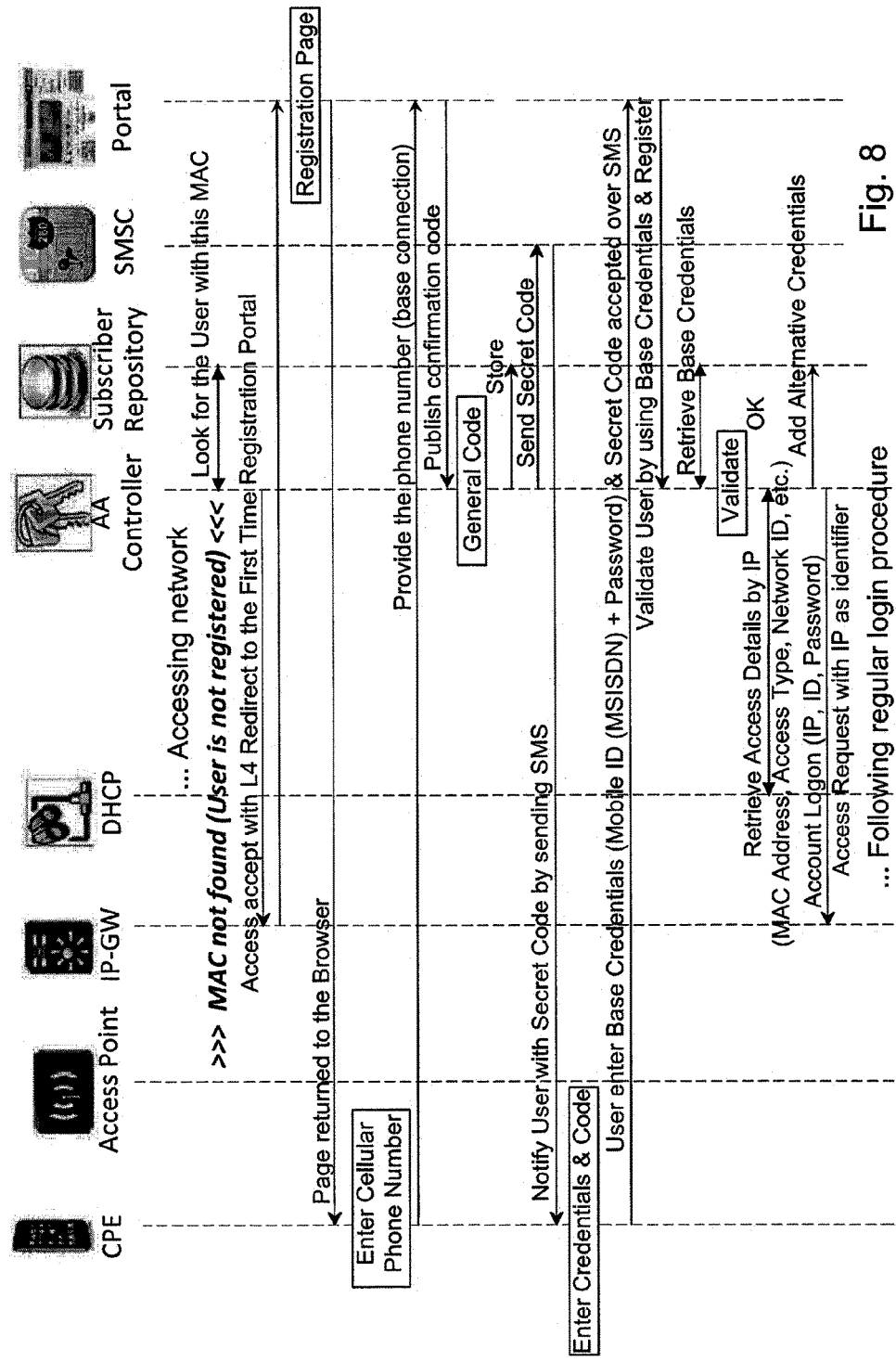
FIG. 8 illustrates flow of the user first time registration in the visited network hardened with secret code verification.

Corresponding message sequence chart relating to SMS Assisted Secure Registration is provided in the diagram demonstrated in FIG. 8.

Location correlation technique utilizes the fact that both cellular and Wi-Fi connections are established by the same device, recognized by the different wireless networks separately.

In case when networks infrastructures include location management facilities (systems, enabling detection of the user location), both locations (when user is connected to Wi-Fi and Cellular networks his location could be detected by using Wi-Fi network topology and cellular as well. User may appear in different but close positions.) could be retrieved by the AAA controller during the registration for the further proximity correlation. This is an additional validation strengthening technique that optionally could be applied.

CPE (User Equipment) must appear at the same location to pass security check.

Minding that the Locations of connections, such as the RAN Cell and Wi-Fi Access Point, may vary, the operator may implement a kind of configurable tolerance range when comparing location information coming from appropriate location servers, if the identified locations of the connections are not identical.

Figure 9:
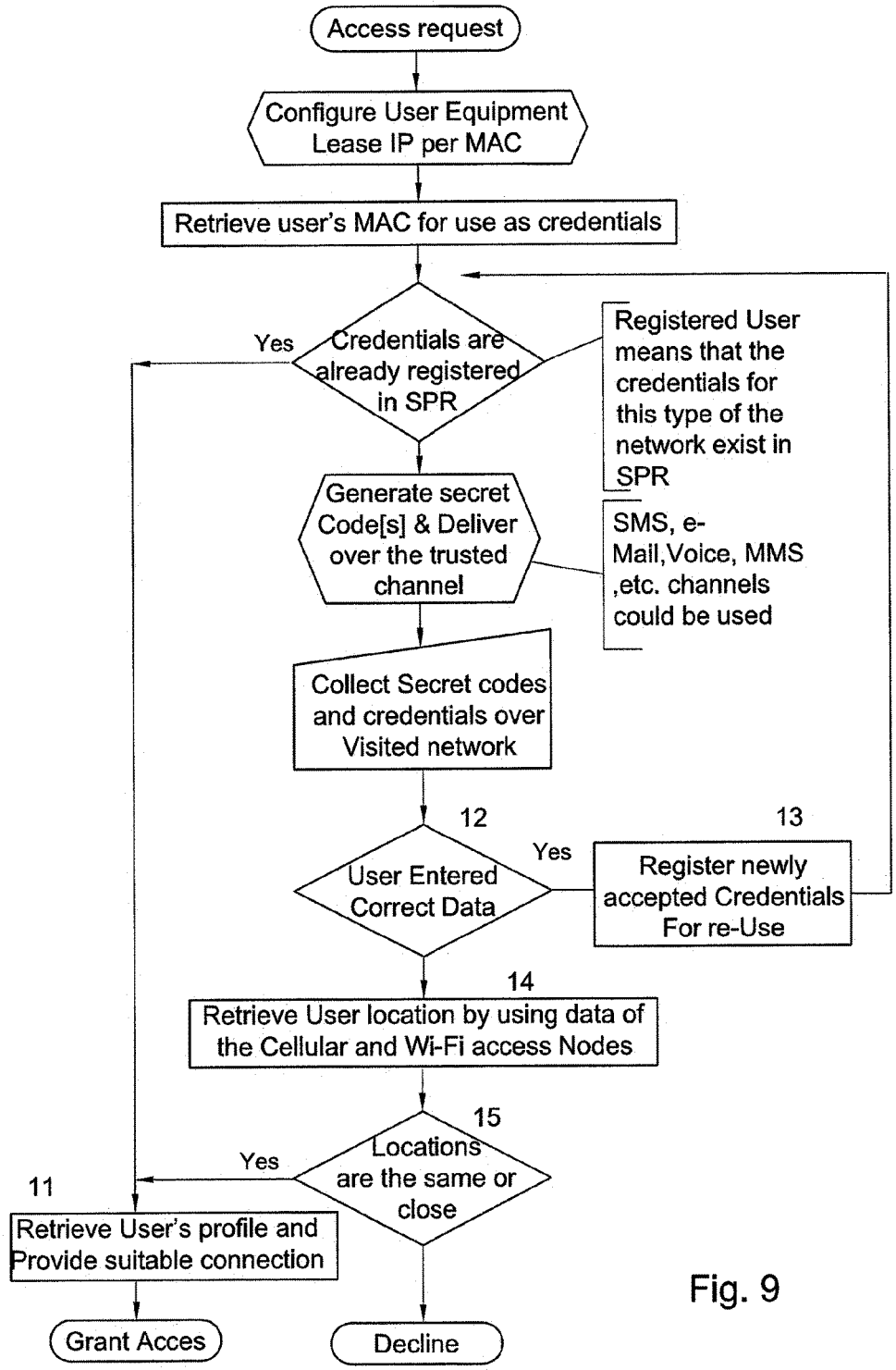
FIG. 9 illustrates algorithm of the user first time registration in the visited network, hardened with location proximity verification.

FIG. 9 is a flow chart illustrating an example of the operation of accessing a network while assisting for example, Location Correlation to secure registration.

Location Correlation procedure requires location information to be available for all networks used in the registration algorithms. The example shown in FIG. 9 illustrates the case when Wi-Fi Access Point location is maintained by DHCP server and RAN Cell location of the registered Cell Phone is provided by dedicated Location Server. Cellular phone location is updated on establishing call. One of the techniques of Wi-Fi AP & CPE correlation is based on the ability of AP to mark the transit traffic with unique AP label, so that this label could be later retrieved from the traffic and used for identifying AP at any point.

Figure 10:
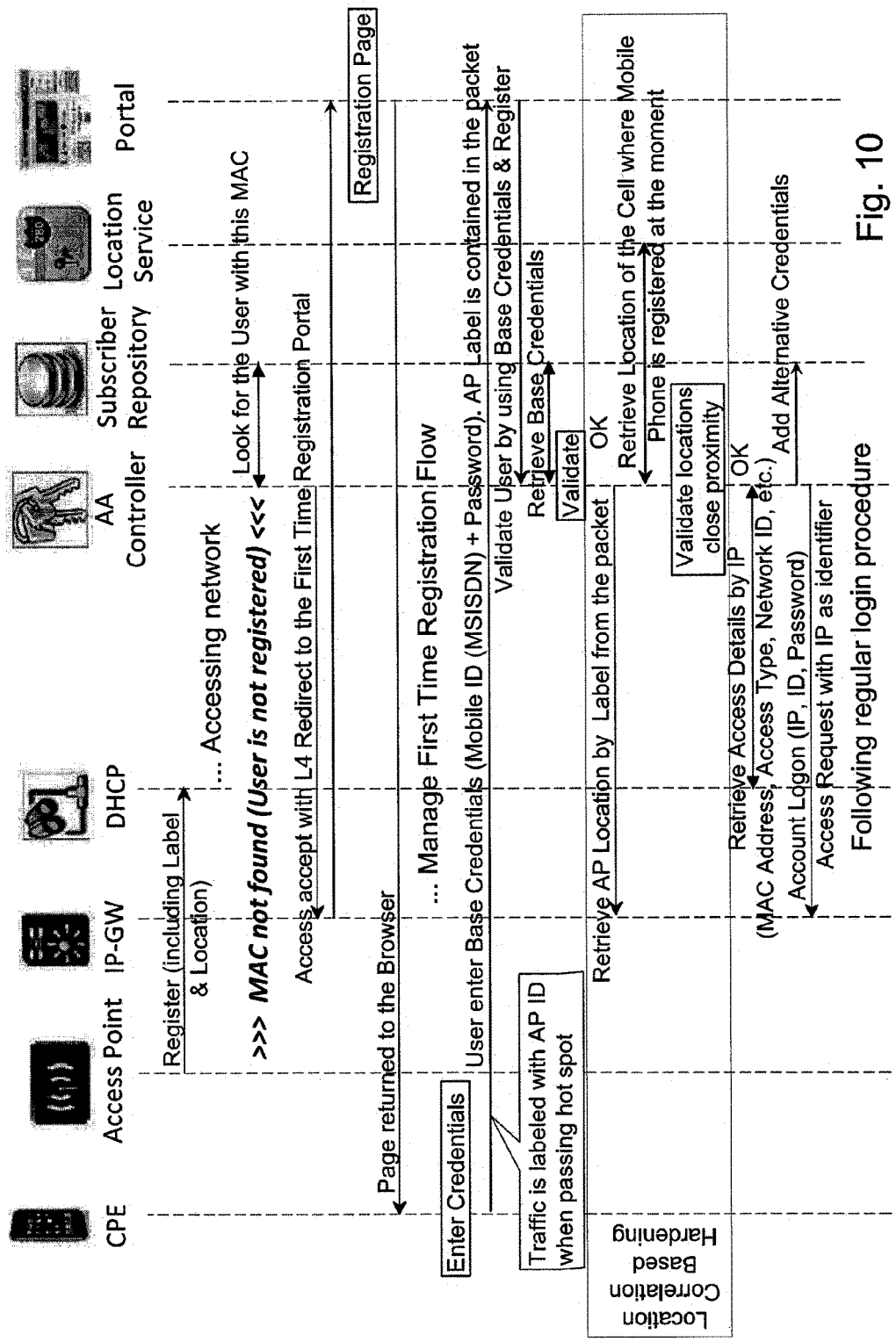
FIG. 10 illustrates flow of the user first time registration in the visited network hardened with location proximity verification.

Corresponding message sequence chart relating to location Correlation Assisted Registration is provided in FIG. 10.

Both SMS and Location Assisted procedures could be used separately and in combination.

According to certain embodiments of the invention, the SPR may occasionally request the subscriber to re-verify the correlation between the different credentials, every interval (e.g. every week), in order to decrease the likelihood of identity theft. According to non limiting example, this procedure may be operated e.g., by standard managing aging timers on the credentials in the SPR.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

Those skilled in the art will readily appreciate that various modifications and changes can be applied to the embodiments of the invention as hereinbefore described without departing from its scope, defined in and by the claims associated with the present invention.

What is claimed is:

1. A method of authorizing network access, comprising:
by a controller with a processor and memory, the controller in communication with a first network for controlling access to the first network:
receiving via the first network, from a user equipment having a user registered in a visitor network, an access request to access the first network, wherein the access request includes a MAC address of the user equipment;
performing a query, using the received MAC address, in a subscriber repository;
if, based on a result of the query, the received MAC address is not found in the subscriber repository:
sending a credential request to the user equipment;
receiving a credential from the user equipment;
generating a single use code;
causing storage of the single use code in the subscriber repository, correlated to the received MAC address;
sending the single use code to the user equipment via a trusted channel;
receiving a new code and a new credential via the visitor network;
comparing the new code and the single use code; and
based on a result of the comparing, if the new code matches the single use code, registering the new credential for re-use by the user equipment.

2. The method of claim 1 wherein
sending to the user equipment the single use code via the trusted channel comprises:
sending the single use code to the user equipment in a voice communication.

3. The method of claim 1, wherein the credential received from the user equipment comprises a cellular phone number.

4. The method of claim 1, wherein the trusted channel comprises a short message service (SMS) communication.

5. The method of claim 1, wherein the trusted channel comprises a MMS communication.

6. The method of claim 1, wherein the sending the single use code comprises sending the single use code in an email.

7. The method of claim 1, wherein sending the credential request to the user equipment further comprises:
directing the user equipment to a registration webpage.

8. A non-transitory computer-readable medium having computer-executable instructions stored thereon which, when executed by one or more computer processors of a controller in communication with a first network for controlling access to the first network, cause the one or more computer processors to perform steps of a method for authorizing network access, the method comprising:
receiving via the first network, from a user equipment having a user registered in a visitor network, an access request to access the first network, wherein the access request includes a MAC address of the user equipment;
performing a query, using the received MAC address, in a subscriber repository;
if, based on a result of the query, the received MAC address is not found in the subscriber repository:
sending a credential request to the user equipment;
receiving a credential from the user equipment;
generating a single use code;
causing storage of the single use code in the subscriber repository, correlated to the received MAC address;
sending the single use code to the user equipment via a trusted channel;
receiving a new code and a new credential via the visitor network;
comparing the new code and the single use code; and
based on a result of the comparing, if the new code matches the single use code, registering the new credential for re-use by the user equipment.

9. The non-transitory computer readable medium of claim 8, wherein sending the credential request to the user equipment further comprises directing the user equipment to utilize a registration webpage.

10. The non-transitory computer readable medium of claim 8, wherein the credential received from the user equipment comprises a cellular phone number.

11. A system for authorizing network access, comprising a controller with a processor and memory, the controller in communication with a first network for controlling access to the first network, the controller configured to:
receive via the first network, from a user equipment having a user registered in a visitor network, an access request to access the first network, wherein the access request includes a MAC address of the user equipment;
perform a query, using the received MAC address, in a subscriber repository;
if, based on a result of the query, the received MAC address is not found in the subscriber repository:
send a credential request to the user equipment;
receive a credential from the user equipment;
generate a single use code;
cause storage of the single use code in the subscriber repository, correlated to the received MAC address;
send the single use code to the user equipment via a trusted channel;
receive a new code and a new credential via the visitor network;
compare the new code and the single use code; and
based on a result of the compare, if the new code matches the single use code, register the new credential for re-use by the user equipment.

12. The system of claim 11, wherein the credential received from the user equipment comprises a cellular phone number.

13. The system of claim 11, wherein to send the single use code to the user equipment via the trusted channel comprises sending the single use code to the user equipment in a voice communication.

14. The system of claim 11, wherein the trusted channel comprises a short message service (SMS) communication.

15. The system of claim 11, wherein the trusted channel comprises a MMS communication.

16. The system of claim 11, wherein to send the single use code to the user equipment comprises sending the single use code in an email.

17. The system of claim 11, wherein to send the credential request to the user equipment further comprises directing the user equipment to a registration webpage.

\* \* \* \* \*